July 12, 1938.  S. BOGUT  2,123,164
AUTOMATIC AIR BRAKE RELEASE VALVE
Filed Oct. 8, 1937  3 Sheets-Sheet 1

July 12, 1938.  S. BOGUT  2,123,164
AUTOMATIC AIR BRAKE RELEASE VALVE
Filed Oct. 8, 1937   3 Sheets-Sheet 2

Inventor:
Stanley Bogut,
By John F Brezina
Attorneys.

July 12, 1938.  S. BOGUT  2,123,164
AUTOMATIC AIR BRAKE RELEASE VALVE
Filed Oct. 8, 1937  3 Sheets-Sheet 3
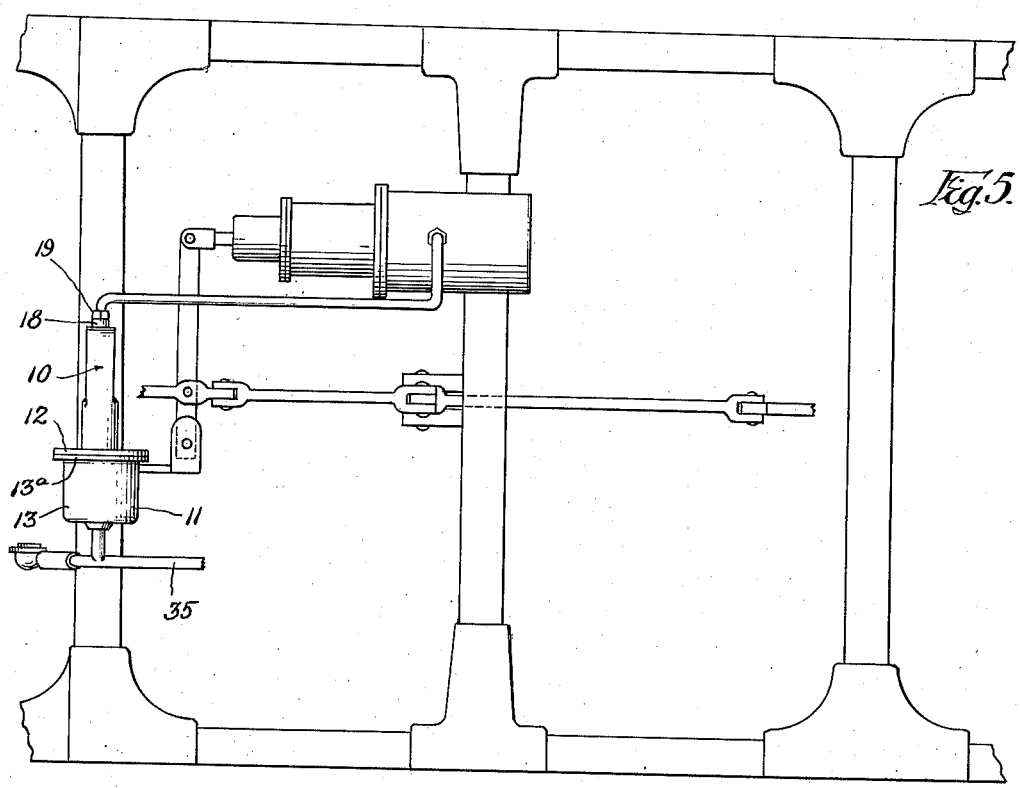
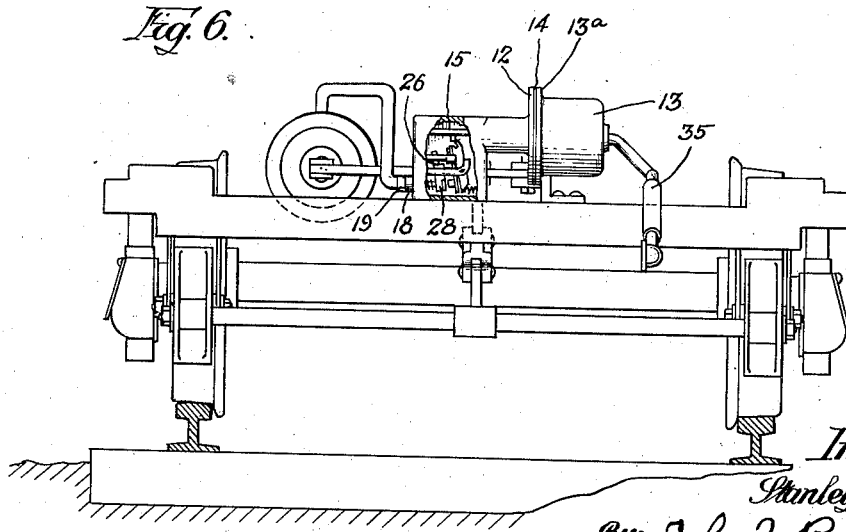
Inventor:
Stanley Bogut,
By: John F Brezina
Attorneys Patented July 12, 1938

2,123,164

UNITED STATES PATENT OFFICE 2,123,164

AUTOMATIC AIR BRAKE RELEASE VALVE

Stanley Bogut, Chicago, Ill.

Application October 8, 1937, Serial No. 167,943

13 Claims. (Cl. 303—80)

My invention consists of an automatic air brake release valve or leader valve mechanism in association therewith adapted to lead and gradually release the compressed air from within a reservoir which forms part of the standard air brake equipment on modern railway cars, and which action in turn releases the conventional brakes on said car.

The standard and conventional air brake mechanism and system on modern railway cars includes a compressed air tank which is also known as a compressed air auxiliary reservoir, a cylinder in direct connection therewith in which cylinder a piston is slidably mounted, and the stuffing box housing through which a push rod is slidable, said push rod having one end connected to the piston. The train line, the air reservoir and the cylinder have communicating passageways as is well known which merge in the standard three-way valve the selective operation of which controls the passage of compressed air from the train line to the air reservoir and from the air reservoir to the cylinder, the latter action pushing toward the standard push rod which in turn actuates a system of levers which pull and push brake shoes in and out of frictional engagement with the car wheels, said system of levers including the cylinder rod, the cylinder lever, top truck rod, the truck live lever, bottom rod, truck dead lever and respective arms on which the respective brake shoes are mounted.

In the standard air brake systems, such as for example the Westinghouse mechanism, the air brake systems on the respective cars are controlled from the locomotive by the actuation of suitable levers to cause a substantial reduction in the air pressure in the train line, the train line being of course continuous and connected by the well known flexibly mounted hose couplings at the end of the respective cars. The reduction of pressure in the train line throws the three-way valve into a position to close the passage from the train line to the air reservoirs and to open the passages connecting the air reservoirs and the piston-containing cylinder, which of course moves the piston to project the conventional push rod to operate the respective levers and apply the brakes on each car.

The ordinary standard air tanks or air reservoirs, which are built and mounted as a unit in combination with the cylinder and stuffing box housing, has an air outlet for it and a valve therein with suitable lever and connected push rod which must be actuated by the brakeman on each car which has been parked on a side track or other temporary position, manually opening a set of valves requiring brakemen to go to each car in order to release the brakes of every car in the group which it is proposed to be moved. This necessarily takes considerable time and work and causes a delay in the movement and switching of cars in railway yards and other places where time is an important element.

My invention has for one of its objects the provision of an automatic release valve for air brake mechanisms and systems which eliminates the necessity of manually opening the air brake release valve on each car when it is desired that the cars be moved.

A further important object of my invention is the provision of a compact, self-actuating mechanism in association with the compressed air circuit of a standard air brake system which will automatically release the brake-actuating piston from locking position by gradually and in a short interval leading and releasing the air from the cylinder housing the slidable piston.

A further important object of my invention is the provision of a mechanism and device for automatically releasing the air from a compressed air cylinder to release the brake-actuating piston and the brake shoes from braking position, in combination with means and mechanism which are responsive to gravity to render my device, an air brake release valve, inoperative when the car in which it is mounted is on an incline such as would be likely to cause it to roll from the position into which it is initially placed.

An important object of my invention is the provision of an air brake valve operating mechanism which will operate only when the car in which it is mounted is on trackage sufficiently level as not to cause the car to roll by gravity from the position into which it is initially placed, and which means and mechanism will not operate to release the brakes of the car when such car is upon an incline sufficient to cause it to roll by gravity if the brakes were released.

Other and further important objects of my invention will be apparent from the following description and claims.

This invention (in a preferred form) is illustrated in the drawings and hereinafter more fully described.

Figure 1:
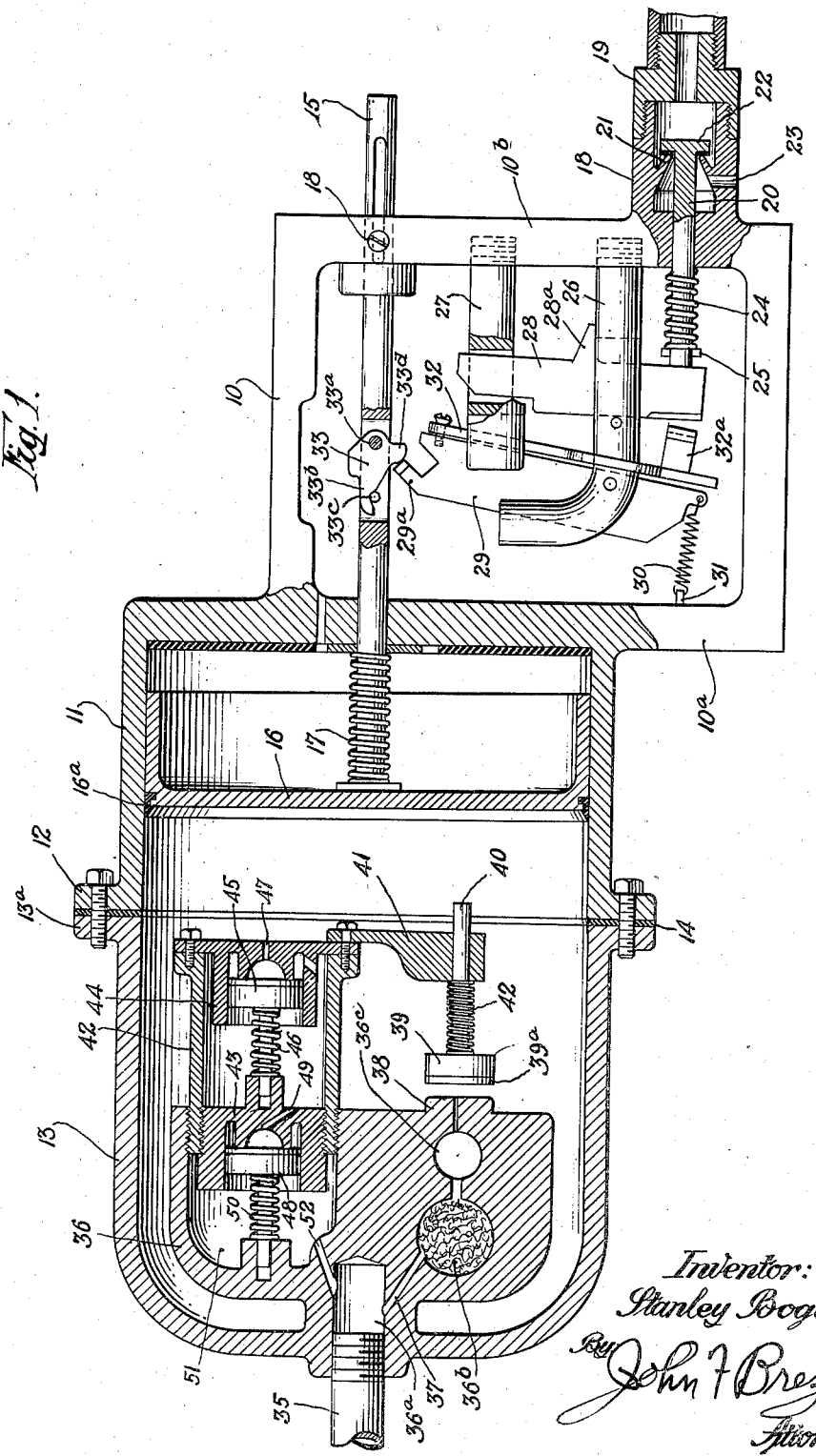
Fig. 1 is a partial cross sectional and partial side elevational view of my automatic air brake release valve.

Fig. 5 is a top plan view illustrating schematically one of the positions in which my device may be mounted with respect to a conventional air brake system with respect to the frame of a railway car, and Fig. 6 is a view taken from the center of the car and looking toward the car trucks at one end and illustrating the relative position of my device with respect to a standard air reservoir, cylinder and brake mechanism.

Reference numeral 10 designates a metal mounting means or frame which, in the illustration of the drawings, is shown as substantially rectangular but which may assume any other convenient shape and at the same time provide means for mounting the parts connected thereto and hereinafter described. Mounting frame 10 has vertically extending side members 10a and 10b integral therewith, side member 10a extending above the upper cross piece of frame 10 and has formed integral therewith a metal cylinder 11 which terminates in an annular integral substantially right-angled flange 12.

Figure 2:
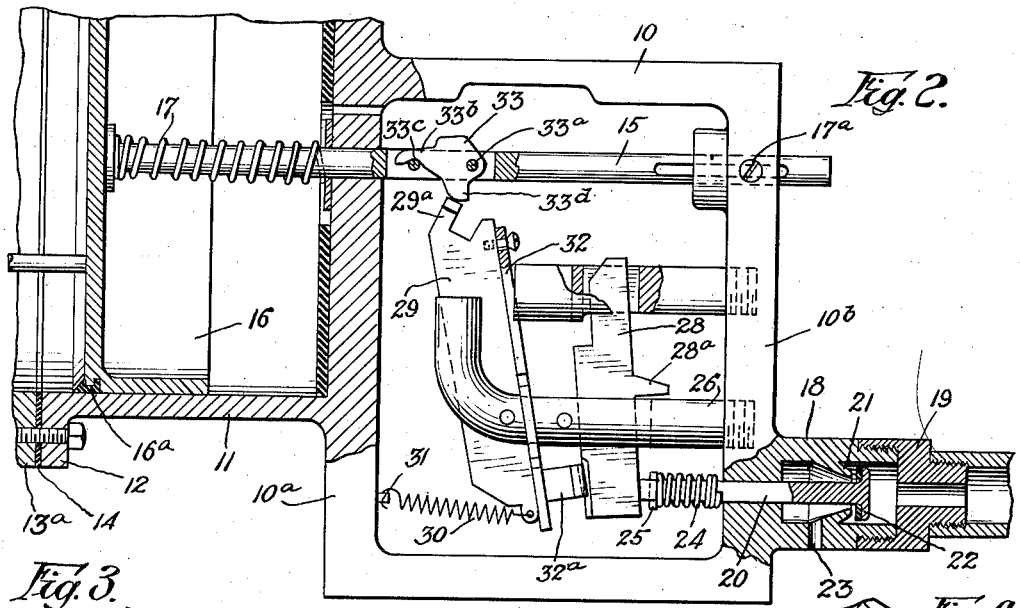
Fig. 2 is a partial side elevational, partial cross sectional view of a part of my air brake release valve and illustrating the air valve release mechanism in position to permit leading of the air.

Reference numeral 13 designates a cylindrical cap-like housing of metal which has annular flanges 13a formed integral therewith and coinciding and fitting substantially opposite the annular flange 12 of cylinder 11. A circular gasket 14 is secured between flanges 12 and 13a and forms a sealing means between said flanges 12 and 13a. The piston rod 15 is slidably journalled through suitable apertures formed in horizontal alignment in the members 10a and 10b of frame 10 and extends a short distance in each direction, one end thereof being secured to the slidable metal piston 16 which fits in and slides snugly in the cylinder 11 and which also carries on the face thereof an annular rubber gasket 16a which forms an air-tight seal with the wall of cylinder 11. As shown in Figs. 1 and 2, said gasket is held on the periphery of the piston 16 by its elastic action and engagement upon a suitable peripheral annular groove and shoulder thereof, the exposed surface of said rubber gasket 16a being suitably bevelled.

A compressible helical spring 17 is mounted about portion of the piston rod 15 between cylinder 11 and normally returns the piston 16 to position adjacent to the intermediate wall 14. The opposite end of piston rod 15 is slotted and screw 17a, which is suitably threaded through frame member 10b, passes into said slot and prevents any partial rotation of piston rod 15 or cylinder 16.

An integral transversely extending nipple 18 is formed integral with the frame 10 at its lower end, and said nipple has external threads which threadably engage cooperating threads of the enlarged portion of a reducing coupling 19, as clearly shown in Figs. 1 and 2, said nipple 18 and reducing coupling 19 providing a chamber or housing for valve 20 which is of the stem type and which is slidably mounted in a suitable aperture in frame 10 centrally of said nipple 18. Nipple 18 has outwardly extending integral annular flange 21 which provides an annular seat for the valve, as clearly shown in the drawings. A gasket or sealing ring 22, preferably made of rubber, is mounted upon the seating surface of the valve 20 where it seats upon the annular shoulder 21 to form an air tight seal. The reduced threaded end of the reducing coupling 19 is connected by suitable air conduits or pipes to the outlet port of the air reservoir of the standard air brake mechanism, one of the manners in which such connection is made being shown in Fig. 5. A fragment of the air conduit forming a connection to the air reservoir outlet port is shown at the right hand end of Figs. 1 and 2.

An air outlet port 23 is made in the wall of nipple 18 and behind the annular shoulder and valve seat. A compressible coil spring 24 is mounted upon the valve stem of valve 20 and between the frame member 10b and a cross pin 25, said spring normally holding the valve 20 in closed position wherein the air which is compressed at a substantial pressure in the air reservoir and which is holding the brakes in braking position will be effectively sealed and held. It will be apparent that when the valve 20 is opened the air in the air reservoir of the standard braking mechanism will be allowed to gradually bleed from the reservoir to release the brake operating piston to in turn release the brakes.

An important problem and accomplishment and object of my invention is the provision of a device and mechanism which will operate and release the valve 20, bleed the air reservoir and release the brakes only when the car is parked or sidetracked on railway trackage whose position is sufficiently near level, or horizontal, as not to cause the car to roll by gravity if the brakes were automatically released. Likewise, the object and accomplishment of my mechanism which I will hereinafter describe is that if the car is on trackage of an incline which is sufficient to normally overcome the friction of the wheels upon the tracks, that only a part of my mechanism will operate but will not open the valve 20 to release the air from the air reservoir which normally releases the brakes. That particular part of my mechanism I will now describe.

A mounting hook 26 has one end secured by threading or the like in frame member 10b and has its other end bifurcated over substantially one-half its length, the recess formed by bifurcation extending vertically. A shorter and upper mounting rod 27 has one end thereof secured in frame member 10b a short distance above mounting hook 26. The free end of mounting rod 27 is preferably enlarged and bifurcated in a vertical direction, and also provides means whereby the upper end of a pivotal lever 28 is pivoted, the preferred illustrations illustrating the upper end of said lever 28 as loosely engaging a recess of said arm 27.

As clearly shown in Figs. 1 and 2, the lower end of lever 28 is suspended and passes through the bifurcation of the mounting hook 26 and extends to a point below the outer end of the stem of the valve 20. An integral stud 28a is provided to hold said lever 28 from normally falling below the desired position illustrated in Figs. 1 and 2. The outer bifurcated end of the mounting arm 27 and the vertical recess receives the lower portion of an actuating and motion-transmitting lever and hereinafter described.

Figures 3, 4:
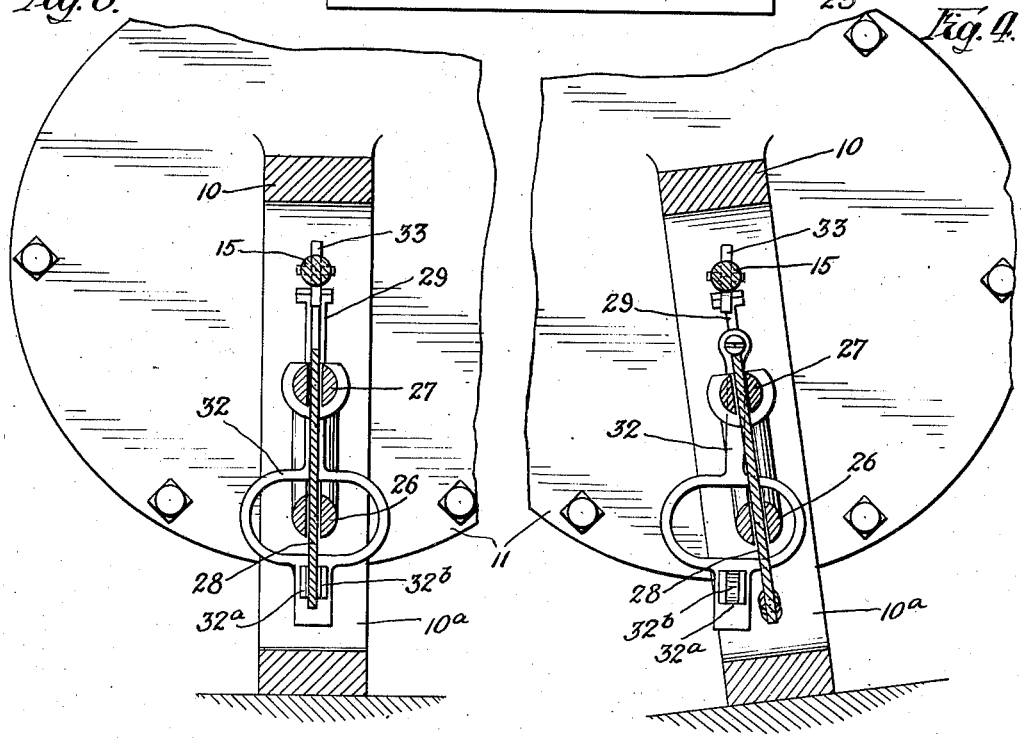
Fig. 3 is an enlarged cross sectional view taken on line 3—3 of Fig. 2, and with parts broken away.
Fig. 4 is a view similar to Fig. 3 showing a cross sectional view with parts broken away and showing the same in inclined position and the valve opening mechanism in inoperative position.

As shown in Figs. 1, 3 and 4, actuating lever 29 has its lower end apertures connected by a relatively small coil spring 30 to a suitable stud 31 formed on the member 10a of frame 10. A pendulum-like key 32 of suitable metal has its upper end swingingly pivoted by a suitable screw to the upper end of actuating lever 29, said key having its intermediate part formed in the shape of an oval ring, as clearly shown in Figs. 3 and 4, and also having at its lower end a perpendicularly extending stud 32a secured therein.

The stud 32a has its free end beveled along the sides, as clearly indicated at 32b, in Fig. 3, said bevelled end terminating in a relatively shallow recess which is adapted to engage and push against the sharp bevelled edge at the lower end of lever 28, the opposite edge of lever 28 bearing and pushing against the end of the valve stem 20 against the normal action of the coil spring 24 to in turn open the bleeder valve 22. It will be noted, particularly from Fig. 4, that the key 32 will swing like a pendulum responsive to gravity when the mechanism comprising my invention and whatever vehicle it is attached to is inclined to any substantial degree. Fig. 4 shows the position which the key would assume when the device, and the car to which it is attached, is substantially tilted toward one end, the stud 32a being thereby placed in non-alignment with the lever 28 and the valve stem so that when normal motion of the mechanism takes place the key 32 and stud 32a will not push lever 28 and the valve stem but will slide past the bevelled edge of the lower end of lever 28 to thereby leave the bleeder valve 22 in a closed position.

The upper end of pivoted lever 29 is preferably bifurcated, as indicated in Figs. 1 and 2, so that one position of said end forms a suitable upwardly extending projection or stud 29a. Said projection 29a preferably extends in a diagonal direction as indicated, and is adapted to be engaged by a pawl 33 which is pivoted by pivot 33a upon a suitable vertical flat side surface of the piston rod 15, said flat surface being substantially midway between its ends. Pawl 33 has a horizontally extending integral projection 33b which normally rests upon stop stud 33c which normally holds the pawl in operative position, and also has extending integral projection 33d which engages the diagonal projection 29a of lever 29 when piston rod 15 is moved longitudinally. When the piston 16 and piston rod 15 are moved from the left-hand position (looking at Figs. 1 and 2) to right-hand position, the integral projection 33d engages projection 29a to cause pawl 33 to pivot upwardly without changing the position of lever 29 or key 32.

When the piston 16 and piston rod 15 are moved from right-hand position to the extreme left, the lower projection 33d pivots lever 29 in counter-clockwise direction to thereby push key stud 32a toward the right and impart right-hand movement to lever 28, valve stem 20 and to cause valve 22 to open, this action permitting the air from the air reservoir to be slowly let out to thereby permit retraction of the brake-actuating piston forming part of the conventional railway brake mechanism.

I will now describe the means and mechanism which, in cooperation with the train line of the conventional railway air brake system, causes the retraction and projection, or right and left hand movement of piston 16 and piston rod 15. Looking at the right of Fig. 1, reference numeral 35 designates the air pipe forming a connection to and part of the train line. As is well known, the train line is the air pipe which extends from end to end of each car and which is connected between the respective cars by a flexible hose and coupling to form a continuous air passage from the manually operated mechanism on the locomotive of the train.

Reference numeral 36 designates an interior dome-like metal member having a plurality of chambers, including the forward inlet chamber 36a which is in the form of an aperture in the end of the housing 13 and member 36 and into which the train line pipe 35 is threaded. Lower air chamber 36b is formed in the dome-like member 35 and communicates with chamber 36a by a restricted passageway 37, as clearly shown in the drawings. 36b is used as an air cleaner chamber and has a mass of material therein such as hair or shavings through which the air easily passes, the said mass retaining substantially all dust or foreign particles which may be carried by the air in order to prevent the same from being carried into the operating parts of my device. A second smaller chamber 36c is preferably, though not necessarily, formed as a part of dome member 36, which chamber together with its opposite extending communicating passages forms a passage from air cleaner chamber 36a to the interior of housing 13.

The dome-like member 36 has an annular boss 38 formed integral therewith through which the air passageway from chambers 36b and 36c passes, the outer surface of said boss forming a suitable flat seat for a spring actuated valve which I will now describe.

Reference numeral 39 designates a valve having a suitable sealing washer or gasket 39a which is secured to one end of valve stem 40, the valve stem 40 being slidably mounted on a depending metal arm 41. A spring 42 mounted about valve stem 40 normally holds valve 39 in closing position against the air passage leading from chambers 36b and 36c, the opposite end of valve stem 40 being adapted to engage the piston 16 and piston rod 15, as more fully hereinafter set forth.

Reference numeral 42 designates a cylindrical valve housing which is mounted with respect to the aforementioned dome-like member 36 and which has a pair of horizontally extending bushings 43 and 44 mounted therein and spaced apart in position. A valve 45, preferably of the stem type, is slidably mounted in bushing 44 and normally held by a coil spring 46 in closing position against the outlet aperture 47 formed in the end wall of cylindrical housing 42. A second valve 48, which may be of the stem type as illustrated, is slidably mounted in bushing 43 and is normally held in closed position against the air outlet passageway 49 by coil spring 50, which spring is mounted about the stem thereof, as clearly shown in Fig. 1. Said bushing 43 forms an air compartment 51 in dome member 36, the interior of which communicates with the chamber 36a by air outlet passage 52.

I will now proceed to describe the operation of my invention in connection with the standard railway brake operating systems in one complete cycle.

When the locomotive is connected to a string of cars proposed to be moved and which have their brakes released, the compressed air is first run into the train line whereupon it enters chamber 36a. Some of the air will enter through passage 52 to assist spring 50 to hold the valve 48 closed against air outlet passage 49. Air will also enter air passageway 37 and pass through air cleaner chamber 36b, through auxiliary chamber 36c to push valve 39 open against the action of spring. The compressed air will continue to enter housing 13 and as the pressure goes up to a certain point to overcome the resistance of spring 17, the piston 16 and piston rod 15 will be forced to its extreme right hand position, or projecting position.

As the piston 16 moves to the right or projecting position, the pawl 33 is pivoted and its projection 33d slides over the projection 29a. The air will continue to flow into the housing 13 as directed and also into chamber 51 until air pressure equal to that of the train line is reached. The train and cars are in normal operating and rolling status with brakes released in the air pressure in the train line when air in the housing 13 is at the normal pressure, usually about seventy pounds per square inch. During normal operating status, lever 29 and key 32 and stud 32a are held in the position indicated in Fig. 1 by spring 30, and the valve 22 is held closed by spring 24 to maintain the normal air pressure in the air reservoir in the standard air brake system. During such normal train operating status the pressure on both sides of valves 45 and 48 is equal because the air from the train line enters through chamber 51, through passageway 52 and enters into the chamber between bushings 44 and 43 through outlet 47, and because of the action of spring 50, valves 45 and 48 are thence held in closed position.

When a car or train of cars are side tracked, the brakeman disconnects the train line at the end car of such train of cars and opens the train line valve at such end car to permit escape of the air from the train line, and as the air begins to escape the air pressure within housing 13 immediately closes valve 39 and opens valves 45 and 48 against the action of their respective springs to permit air to pass through air outlet passages 47, 49 and 50 into the train line from whence it continues to escape. As the air escapes from within housing 13, the spring 17 will cause piston 16 and piston rod 15 to retract or to return to its left hand position.

As piston rod 15 returns to its left hand or retracted position, the lower stud 33d pivots lever 29 and key 32 in a clockwise direction, and if the device and the car on which it is attached is at a substantial level, the free end of stud 32a will push against the bevelled edge of lever 28 to in turn push against the stem 20 of valve 22 and against the action of the coil spring 24 to thereby open the valve 22. As the valve housing 19 is connected to the air reservoir which holds the braking mechanism in braking position, the opening of valve 22 will permit the gradual escape of air from the air reservoir through outlet passage 23 to thereby permit a complete retraction of the braking mechanism and release of the brakes. Because of the fact that the air outlet passageway is rather small, the air which has been holding the brakes in braking position will escape gradually, this being a desirable feature in that the car or cars being parked will not be released for several minutes after the locomotive has been disconnected and the train line opened.

As illustrated in the drawings, because of the pendulum-like gravity responsive action of the key 32, my invention should be mounted crosswise or laterally of the car so that when the car is upon a track siding which is of sufficient incline to cause the car to roll, the incline from end to end of the car, when substantially sufficient to cause rolling, will cause the key 32 to swing out of alignment and not open the air bleeder valve from the reservoir, this in order to leave the car braked to prevent rolling.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device for automatically releasing compressed air from a reservoir of an air braking mechanism, a main cylindrical housing, connectable to a train air line; a mounting frame on one end of said housing; a valve housing on said frame; a spring-pressed valve in said housing, said valve housing being adapted to be connected in communication with an air reservoir of a piston-actuated air brake mechanism; a piston slidable in said main housing, a piston rod connected to said piston and slidably journalled in said mounting frame; a dome-like member in said housing having a main air inlet opening connectable to the train line, and an air inlet passageway and an air outlet passageway therethrough communicating with said main air inlet opening; a valve for closing said air inlet passageway, a stem connected to said last mentioned valve and slidably mounted for horizontal movement; a spring on said valve stem for closing said valve; a check valve in said air outlet passageway adapted to close when air pressure is introduced into the main air inlet from the train line, and spring means for normally holding said check valve in closed position.

2. In a device for automatically bleeding air from a reservoir of an air brake system, a frame, a cylindrical housing defining a chamber having an air inlet connectable to a compressed air train line; a bleeder valve housing connectable to the reservoir of an air brake system; a valve in said housing having a stem projecting through a portion of said frame; a piston in said cylindrical housing having a piston rod slidable on said frame, the compressed air in said housing normally holding said piston and piston rod in extreme projected position; a mounting and enclosing member in said cylindrical housing and having an air inlet and an air outlet passageway therethrough; a spring-pressed valve on the air inlet passageway adapted to be opened by introduction of air into the train line and to be closed when the train line air pressure is reduced; valve means in said air outlet passageway adapted to close upon introduction of compressed air into the train line and to open when the said compressed air in the train line is reduced to permit escape of the compressed air from within said cylindrical housing; and lever means on said frame actuable by return of said piston rod and adapted to open said bleeder valve.

3. In a device for automatically releasing compressed air from an air reservoir of a compressed air mechanism, a housing defining a cylinder and chamber and having an air inlet port connectable to a compressed air-containing train line; a valve housing connectable to the air outlet port of a compressed air reservoir, the air in which normally holds the brake mechanism in braking position, an air release valve in said housing, a stem on said release valve, spring means on said stem for normally closing said valve; mounting means rigidly connecting said cylindrical housing and said valve housing; valve mounting means in said cylindrical housing having separate air inlet passages and outlet passages; a spring pressed valve in one of said inlet passages adapted to open to permit entry of air from the train line; valve means in said outlet passages to release compressed air from said housing and adapted to remain closed under normal train line air pressure; a piston slidable in said cylindrical housing, a piston rod connected to said piston and slidably mounted on aforesaid mounting means and adapted to be held in extreme projected position when compressed air remains in the cylindrical housing; and lever mechanism actuable by a return movement of said piston rod for opening said air release valve.

4. In a device for automatically releasing compressed air from an air reservoir of a compressed air mechanism, a housing defining a cylinder and chamber and having an air inlet port connectable to a compressed air-containing train line; a valve housing connectable to the air outlet port of a compressed air reservoir, the air in which normally holds the brake mechanism in braking position, an air release valve in said housing; mounting means rigidly connecting said cylindrical housing and said valve housing; valve mounting means in said cylindrical housing having separate air inlet passages and outlet passages; a spring pressed valve in one of said inlet passages adapted to open to permit entry of air from the train line; valve means in said outlet passages to release compressed air from said housing and adapted to remain closed under normal train line air pressure; a piston slidable in said cylindrical housing, a piston rod connected to said piston and slidably mounted on aforesaid mounting means and adapted to be held in extreme projected position when compressed air remains in the cylindrical housing; and lever mechanism actuable by a return movement of said piston rod for opening said air release valve.

5. In a device for automatically releasing compressed air from an air reservoir of a compressed air mechanism, a housing defining a cylinder and chamber and having an air inlet port connectable to a compressed air-containing train line; a valve housing connectable to the air outlet port of a compressed air reservoir, the air in which normally holds the brake mechanism in braking position, an air release valve in said housing, a stem on said release valve, spring means on said stem for normally closing said valve; mounting means rigidly connecting said cylindrical housing and said valve housing; valve mounting means in said cylindrical housing having separate air inlet passages and outlet passages; a spring pressed valve in one of said inlet passages adapted to open to permit entry of air from the train line; valve means in said outlet passages to release compressed air from said housing and adapted to remain closed under normal train line air pressure; a piston slidable in said cylindrical housing, a piston rod connected to said piston and slidably mounted on aforesaid mounting means and adapted to be held in extreme projected position when compressed air remains in the cylindrical housing; lever mechanism actuable by a return movement of said piston rod for opening said air release valve, said lever mechanism including a spring pressed pivoted lever, and a push-plate movably mounted on said mounting means and a pivoted pawl on said piston rod adapted to move said pivoted lever only upon return movement of said piston rod, said pivoted lever being adapted to engage said release valve stem to open said release valve.

6. In a device for automatically releasing compressed air from an air reservoir of a compressed air mechanism, a housing defining a cylinder and chamber and having an air inlet port connectable to a compressed air-containing train line; a valve housing connectable to the air outlet port of a compressed air reservoir, the air in which normally holds the brake mechanism in braking position, an air release valve in said housing; mounting means rigidly connecting said cylindrical housing and said valve housing; valve mounting means in said cylindrical housing having separate air inlet passages and outlet passages; a spring pressed valve in one of said inlet passages adapted to open to permit entry of air from the train line; valve means in said outlet passages to release compressed air from said housing and adapted to remain closed under normal train line air pressure; a piston slidable in said cylindrical housing, a piston rod connected to said piston and slidably mounted on aforesaid mounting means and adapted to be held in extreme projected position when compressed air remains in the cylindrical housing; a pivoted pawl on said piston rod; and lever mechanism pivoted with respect to said mounting means actuable by said pawl only upon return movement of said piston rod, said lever mechanism being adapted to open said air release valve until the compressed air has been released from the cylindrical housing and said piston and piston rod have returned to retracted position.

7. In a device for automatically releasing compressed air from an air reservoir of a compressed air mechanism, a housing defining a cylinder and chamber and having an air inlet port connectable to a compressed air-containing train line; a valve housing connectable to the air outlet port of a compressed air reservoir, the air in which normally holds the brake mechanism in braking position, an air release valve in said housing; mounting means rigidly connecting said cylindrical housing and said valve housing; valve mounting means in said cylindrical housing having separate air inlet passages and outlet passages; a spring pressed valve in one of said inlet passages adapted to open to permit entry of air from the train line; valve means in said outlet passages to release compressed air from said housing and adapted to remain closed under normal train line air pressure; a piston slidable in said cylindrical housing, a piston rod connected to said piston and slidably mounted on aforesaid mounting means and adapted to be held in extreme projected position when compressed air remains in the cylindrical housing; a pawl on said piston rod; and lever mechanism including a spring pressed lever pivoted with respect to said frame and a suspended gravity-responsive arm pivoted adjacent said lever, the return movement of said piston rod causing said pawl to pivot said lever to move said suspended arm toward said release valve to normally push said valve to open the same when the device is in substantially horizontal position, said suspended arm being adapted to swing to position in non-alignment and in non-alignment with said release valve to avoid opening said valve when the device is in substantially inclined position.

8. In a device for releasing the air from the compressed air container of an air brake mechanism to cause a release of the brakes thereof, a valve housing connectable to the compressed air container of the brake mechanism, an air release valve in said valve housing, spring means for normally holding said valve closed, a metal housing defining a chamber adapted to be connected to the compressed air train line of a train air brake system, a slidable piston and piston rod in said housing chamber, said piston rod projecting exteriorly of said chamber, and being held in projected position by compressed air in the train line, mounting means connecting said metal housing and said valve housing, lever mechanism pivoted with respect to said mounting means, a pawl on the projecting end of said piston rod, the return movement of said piston rod being adapted to cause said pawl to engage and move said lever mechanism to open said valve to release the compressed air from the brake mechanism air container.

9. In a device for releasing the air from the compressed air container of an air brake mechanism to cause a release of the brakes thereof, a valve housing connectable to the compressed air container of the brake mechanism, an air release valve in said valve housing, spring means for normally holding said valve closed, a metal housing defining a chamber adapted to be connected to the compressed air train line of a train air brake system, a slidable piston and piston rod in said housing chamber, said piston rod projecting exteriorly of said chamber, and being held in projected position by compressed air in the train line, mounting means connecting said metal housing and said valve housing, lever mechanism pivoted adjacent said valve housing, a gravity responsive projecting key pivotally suspended adjacent said lever mechanism, the return of said piston rod being adapted to move said lever mechanism, move said projecting key to normally engage and open said air release valve when the air releasing device is substantially level, said pivoted key being adapted to swing to positions wherein it will not open said air release valve when the device and vehicle on which it is attached is in substantially inclined position.

10. In a device for releasing the air from the compressed air container of an air brake mechanism to cause a release of the brakes thereof, a valve housing connectable to the compressed air container of the brake mechanism, an air release valve in said valve housing, spring means for normally holding said valve closed, a metal housing defining a chamber adapted to be connected to the compressed air train line of a train air brake system, a slidable piston and piston rod in said housing chamber, said piston rod projecting exteriorly of said chamber, and being held in projected position by compressed air in the train line, mounting means connecting said metal housing and said valve housing, a gravity suspended projecting key pivoted adjacent said air release valve, lever mechanism pivoted on said mounting means adapted, when moved, to normally push said key, said key, when projected by said lever mechanism, being adapted to push open said air release valve when the device and vehicle on which it is mounted is in substantially horizontal position and when said device and attached vehicle is in substantially inclined position, said key being adapted to move into non-aligning position with said valve to thereby fail to open said valve.

11. In a device for releasing the air from the brake actuating mechanism of a car or the like, an air release valve communicating with the compressed air container of said mechanism, means for normally holding said valve closed, a housing defining a cylinder and communicating with the train line of a multiple vehicle air brake system, an air-impellable piston and piston rod slidable in said cylinder, spring means for normally returning said piston into retracted position, the compressed air in said train line being adapted to normally hold said piston and piston rod in projected position, means for transmitting movement from the return movement of said piston rod to said air release valve, and gravity responsive means cooperating with said last mentioned means whereby the movement of said piston rod is not transmitted to open said air release valve.

12. In a device adapted to automatically release the compressed air from the cylinder of a compressed air system having a compressed air train line, an air release valve adapted to be connected to the brake-actuating cylinder, yieldable means for normally holding said valve closed, a cylindrical housing connectable to the train line of an air brake system, means rigidly connecting said cylindrical housing and said valve, movable means in said housing responsive to air pressure, a slidable element connected to said movable means, a spring for normally returning said slidable element when compressed air is exhausted from the train line, and lever mechanism for transmitting movement from said slidable element to open said valve.

13. In a device adapted to automatically release the compressed air from the cylinder of a compressed air system having a compressed air train line, an air release valve adapted to be connected to the brake-actuating cylinder, yieldable means for normally holding said valve closed, a cylindrical housing connectable to the train line of an air brake system, means rigidly connecting said cylindrical housing and said valve, movable means in said housing responsive to air pressure, a slidable element connected to said movable means, a spring for normally returning said slidable element when compressed air is exhausted from the train line, lever mechanism for transmitting movement from said slidable element to open said valve when said device and attached car is in substantially horizontal position, and gravity responsive means associated with said lever mechanism to render said lever mechanism inoperative to open said air release valve.

STANLEY BOGUT.